United States Patent
Quennehen et al.

(10) Patent No.: US 12,276,206 B2
(45) Date of Patent: Apr. 15, 2025

(54) TURBOMACHINE PART WITH CONNECTING EDGE MADE OF COMPOSITE MATERIAL WITH CERAMIC MATRIX AND SHORT FIBRES AND METHOD FOR THE MANUFACTURE OF SAME

(71) Applicants: SAFRAN AIRCRAFT ENGINES, Paris (FR); SAFRAN CERAMICS, Le Haillan (FR)

(72) Inventors: Lucien Henri Jacques Quennehen, Moissy-Cramayel (FR); Sébastien Serge Francis Congratel, Moissy-Cramayel (FR); Matthieu Arnaud Gimat, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/043,484

(22) PCT Filed: Aug. 26, 2021

(86) PCT No.: PCT/FR2021/051490
§ 371 (c)(1),
(2) Date: Feb. 28, 2023

(87) PCT Pub. No.: WO2022/049339
PCT Pub. Date: Mar. 10, 2022

(65) Prior Publication Data
US 2023/0323776 A1    Oct. 12, 2023

(30) Foreign Application Priority Data

Sep. 3, 2020 (FR) ...................... 2008953

(51) Int. Cl.
F01D 5/28       (2006.01)
C04B 37/00      (2006.01)
F01D 9/04       (2006.01)

(52) U.S. Cl.
CPC ............ *F01D 5/282* (2013.01); *C04B 37/003* (2013.01); *F01D 9/04* (2013.01); *C04B 2237/38* (2013.01);
(Continued)

(58) Field of Classification Search
CPC . F01D 5/282; F01D 9/04; F01D 11/08; F01D 25/246; F01D 11/006;
(Continued)

(56) References Cited

U.S. PATENT DOCUMENTS

2017/0370239 A1    12/2017 Venkataramani et al.

FOREIGN PATENT DOCUMENTS

EP    2406466 B1 *  11/2012  .......... D03D 25/005
EP    3269936 A1 *   1/2018  ............ C04B 35/80
(Continued)

OTHER PUBLICATIONS

Machine Translation of FR3034132A1 PDF File Name: "FR3034132A1_Machine_Translation.pdf".*
(Continued)

*Primary Examiner* — Grant Moubry
*Assistant Examiner* — Ruben Picon-Feliciano
(74) *Attorney, Agent, or Firm* — Pillsbury Winthrop Shaw Pittman LLP

(57) ABSTRACT

A turbomachine part of an annular assembly includes a structural body and a connecting edge integral with the structural body. Each connecting edge includes at least one groove intended to receive a sealing tab. Each connecting edge is made of composite material including a fibrous (Continued)

reinforcement consisting of randomly-oriented short fibres, the reinforcement being densified by a ceramic matrix.

14 Claims, 6 Drawing Sheets

(52) U.S. Cl.
CPC ...... *C04B 2237/60* (2013.01); *C04B 2237/64* (2013.01); *F05D 2230/237* (2013.01); *F05D 2300/603* (2013.01)

(58) Field of Classification Search
CPC . F01D 11/005; C04B 37/003; C04B 2237/38; C04B 2237/60; C04B 2237/64; C04B 35/80; C04B 37/006; F05D 2230/237; F05D 2300/603; F05D 2230/51; F05D 2240/11; F05D 2240/57; F05D 2250/75; F05D 2260/30; F05D 2300/6033; Y02T 50/60
See application file for complete search history.

(56) References Cited

FOREIGN PATENT DOCUMENTS

| FR | 2 942 845 A1 | 9/2010 | |
|----|----|----|----|
| FR | 3034132 A1 * | 9/2016 | ............ F01D 11/122 |
| FR | 3041994 A1 * | 4/2017 | ............ F01D 11/18 |
| WO | WO 2017/060604 A1 | 4/2017 | |
| WO | WO 2017/103411 A2 | 6/2017 | |
| WO | WO 2019/122758 A1 | 6/2019 | |
| WO | WO 2019/122760 A1 | 6/2019 | |

OTHER PUBLICATIONS

Machine Translation of EP2406466B1 PDF File Name: "EP2406466B1_Machine_Translation.pdf".*
Machine Translation of FR3041994A1 PDF File Name: "FR3041994A1_Machine_Translation.pdf".*
Machine Translation of EP3269936A1 PDF File Name: "EP3269936A1_Machine_Translation.pdf".*
International Search Report as issued in International Patent Application No. PCT/FR2021/051490, dated Nov. 19, 2021.

* cited by examiner

[Fig. 1A]
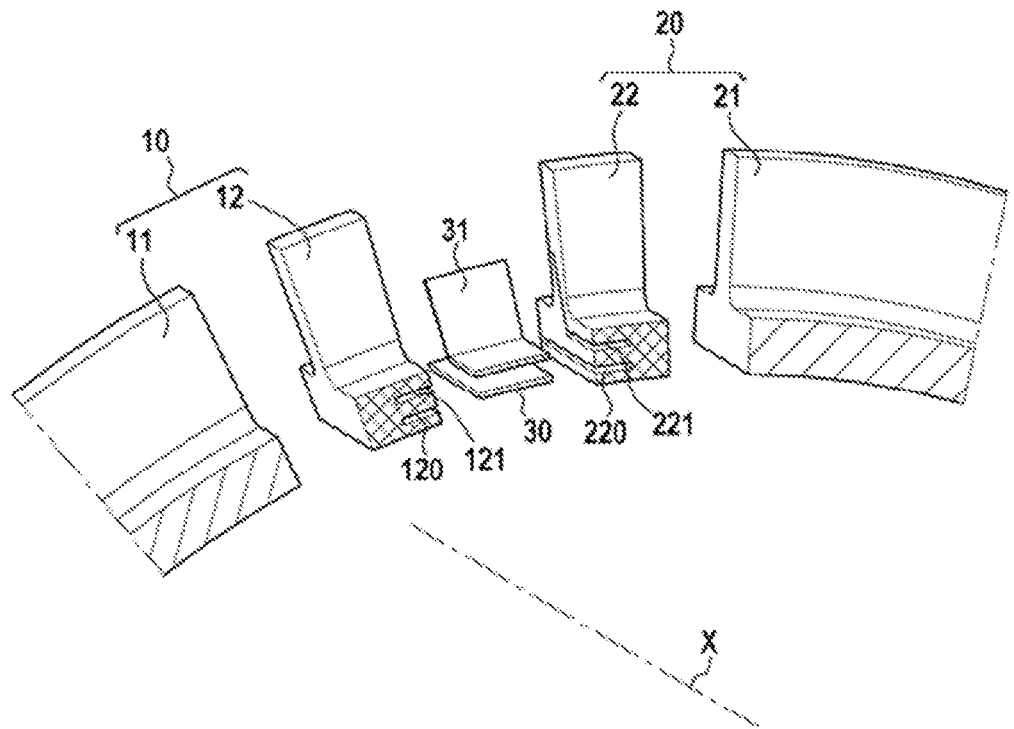
[Fig. 1B]
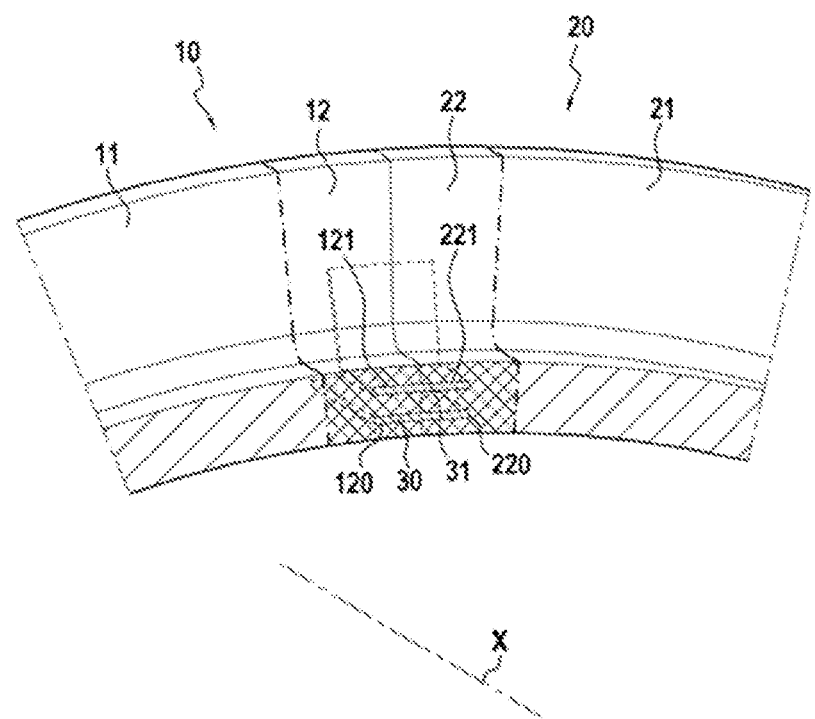

[Fig. 2A]
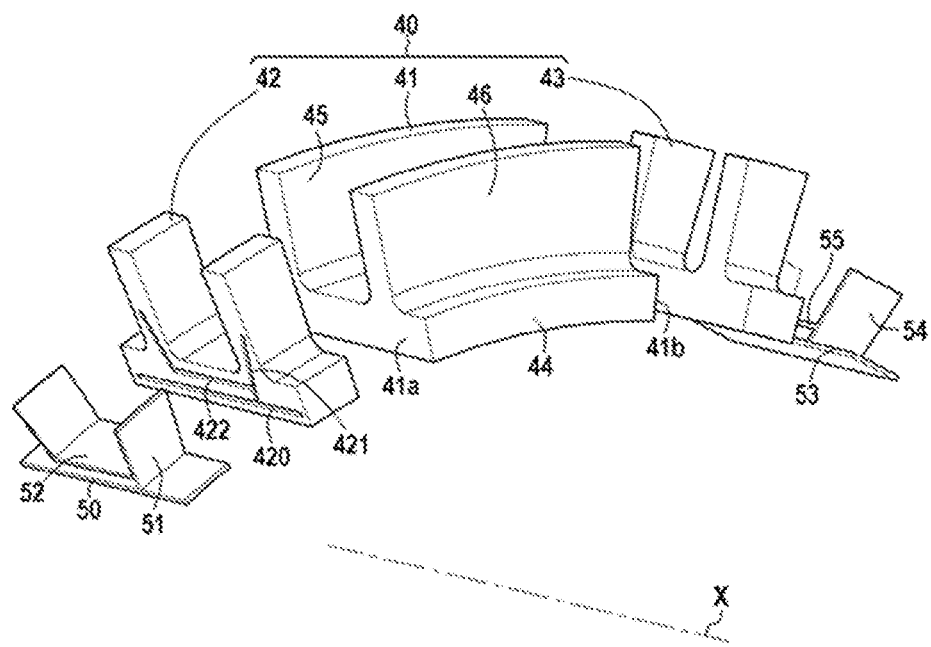

[Fig. 2B]
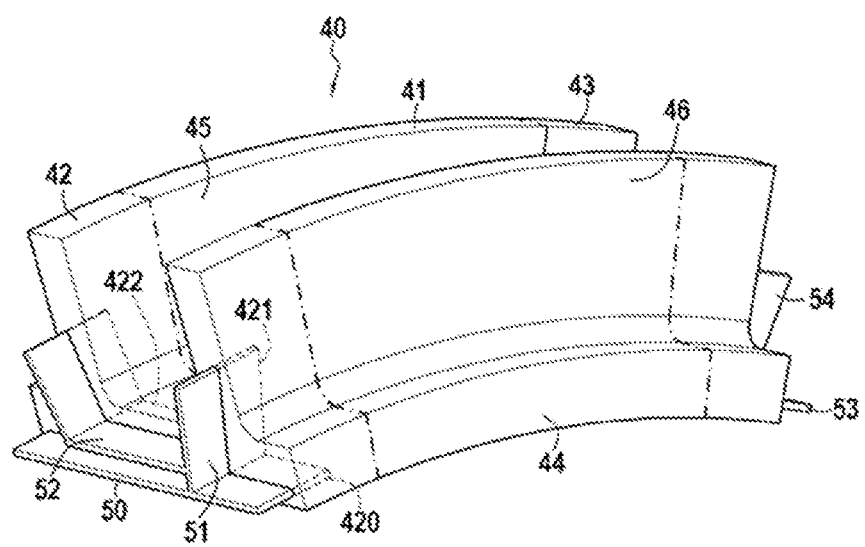

[Fig. 3A]
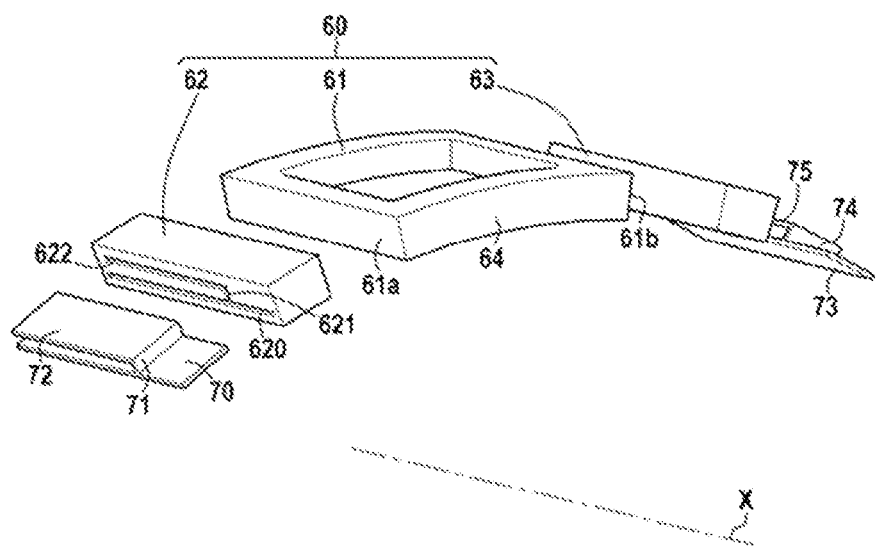
[Fig. 3B]
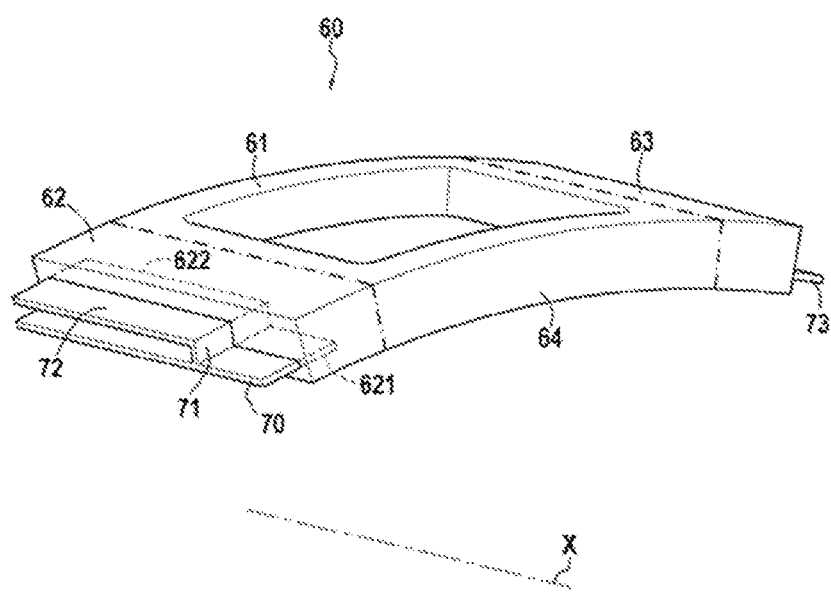

[Fig. 4]
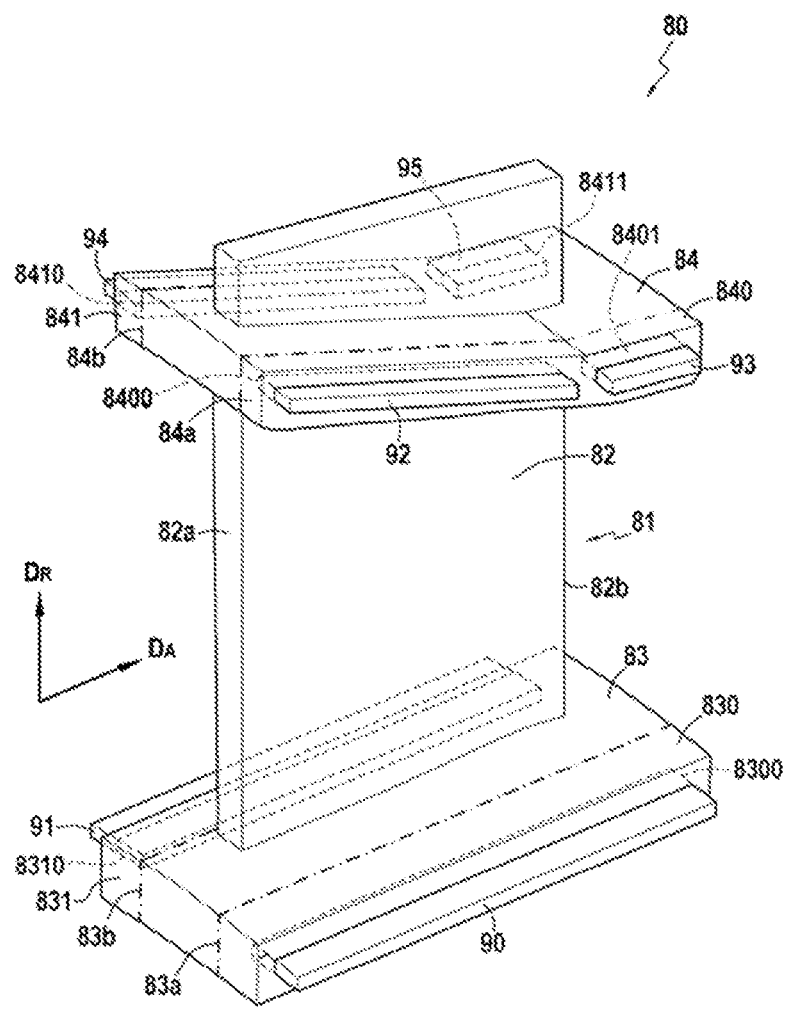

[Fig. 5]
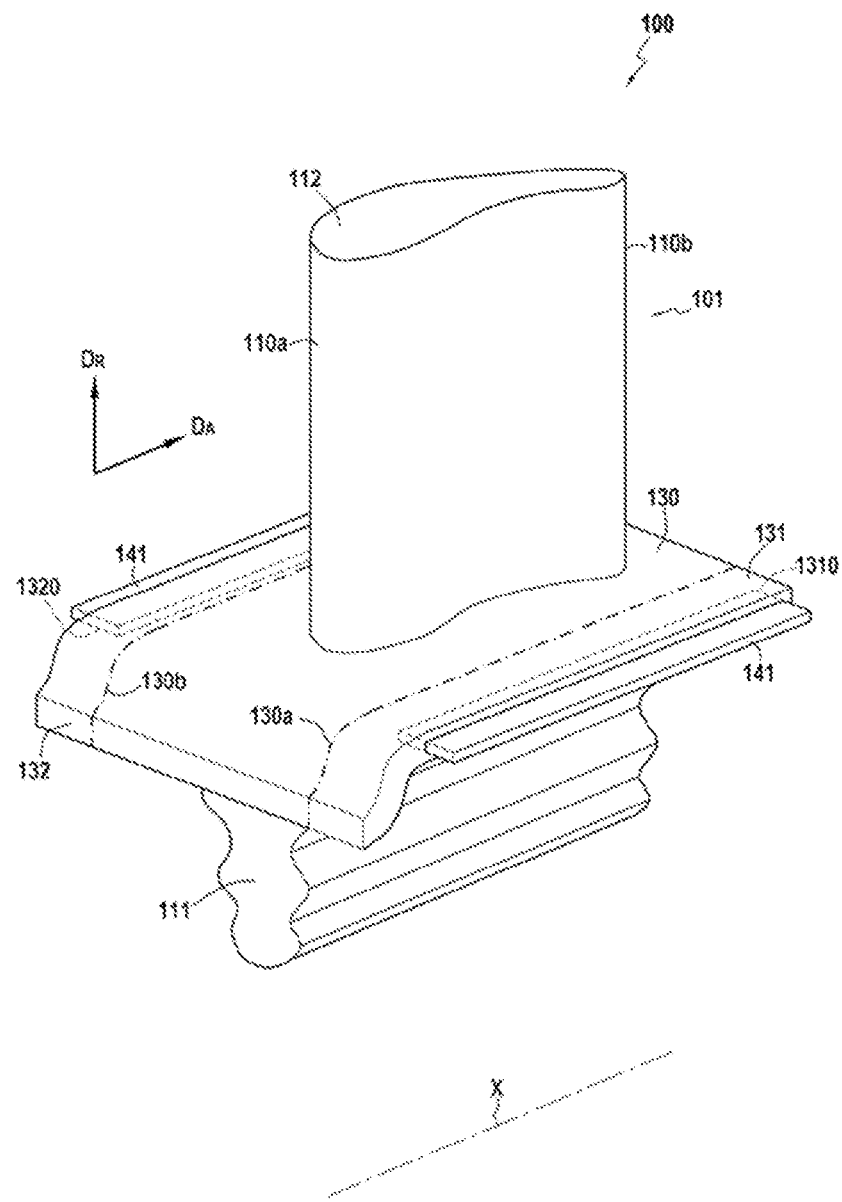

TURBOMACHINE PART WITH CONNECTING EDGE MADE OF COMPOSITE MATERIAL WITH CERAMIC MATRIX AND SHORT FIBRES AND METHOD FOR THE MANUFACTURE OF SAME

CROSS-REFERENCE TO RELATED APPLICATIONS

This application is the U.S. National Stage of PCT/FR2021/051490, filed Aug. 26, 2021, which in turn claims priority to French patent application number 2008953 filed Sep. 3, 2020. The content of these applications are incorporated herein by reference in their entireties.

TECHNICAL FIELD

The present invention relates to turbomachine or gas turbine parts between which a seal must be produced by means of at least one sealing tab housed in grooves present on the connecting edges of adjacent parts.

The invention relates, for example but not exclusively, to a turbine ring assembly for a turbomachine, which assembly comprises a plurality of ring sectors made of ceramic matrix composite material or made of metal material and a ring support structure. The sealing between the adjacent ring sectors is produced by one or more sealing tabs housed in grooves machined in the connecting edges of the sectors.

The ring sectors can be made of metal material. Hot spots are located in the sealing zones produced by the tabs between the ring sectors, due to the high temperatures encountered by the ring in operation. It is therefore necessary, in this case, to provide dedicated cooling ventilation which is relatively detrimental to turbomachine performance.

Ceramic matrix composite materials, or CMC, are known for their good mechanical properties, which make them suitable for constituting structural elements, and for their ability to maintain these properties at high temperatures. The use of CMC for various hot parts of aeronautical engines has already been envisaged, in particular since CMCs have a density less than that of traditionally used refractory metals.

The production of a turbine ring assembly from CMC ring sectors is described, in particular, in WO 2017/060604, the sectors being produced from a fibrous reinforcement obtained by three-dimensional weaving (3D) densified by a ceramic matrix. As for metal material ring sectors, the sealing between the adjacent ring sectors is produced by one or more sealing tabs housed in grooves machined in the connecting edges of the sectors.

Although the use of CMC ring sectors makes it possible to significantly reduce the ventilation necessary for cooling the turbine ring, or even to remove it, the machining of a CMC material comprising a 3D-woven fibrous reinforcement is difficult. It is even more difficult when this machining must be carried out for relatively large dimensions with a high degree of precision, such as for the grooves referred to above which are both relatively deep and fine.

These disadvantages are also present in other sectorised turbine assemblies, in which the inter-part sealing is produced with sealing tabs housed in grooves.

There is therefore a need to easily produce a sealing between parts of a sectorised assembly without having to cool the sealed zone.

DISCLOSURE OF THE INVENTION

For this purpose, the invention proposes a turbomachine part of an annular assembly extending around an axis, the part comprising a structural body and at least one connecting edge integral with the structural body, each connecting edge having at least one groove intended to receive a sealing tab, characterised in that each connecting edge is made of composite material comprising a fibrous reinforcement consisting of randomly-oriented short fibres, said reinforcement being densified by a ceramic matrix. Here, "structural" shall mean the capacity of the body to support mechanical loads and/or to transmit these forces.

By providing the turbomachine part with one or more connecting edges made of ceramic matrix composite material, material that is able to withstand high temperatures, the need for cooling ventilation of the sealing zone or zones between the parts is considerably reduced or even removed. In addition, the connecting edge or edges being made of ceramic matrix composite material and with short fibre reinforcement, the material is easier to machine and it is easier to produce fine and deep grooves. This ensures greater dimensional control and, consequently, greater sealing reliability.

According to a particular aspect of the turbomachine part of the invention, the structural body is made of composite material comprising a fibrous reinforcement consisting of a plurality of layers of yarns linked together by three-dimensional or multilayer weaving, said reinforcement being densified by a ceramic matrix. In this case, the part benefits from the advantages of the CMC material (good temperature resistance for a reduced overall mass) in its entirety, while facilitating the production of grooves for the sealing tabs and the control of the dimensions of said grooves.

According to another particular aspect of the turbomachine part of the invention, the structural body is made of metal material. Thus a part is obtained having a good mechanical strength due to the metal structural body while eliminating the need for cooling in its sealing zones due to the production of connecting edges made of ceramic matrix composite material and short fibres.

According to a particular feature of the turbomachine part of the invention, the part is a turbine ring sector extending in an annual manner around an axis, the sector comprising a sector structural body having an annular base having an inner face intended to define the inner face of a turbine ring when the ring sector is mounted on a ring support structure, and an outer face from which one or more attachment portions of the ring sector extend to the ring support structure, the ring sector further comprising two inter-sector connecting edges at the circumferential ends of the sector structural body, each inter-sector connecting edge being intended to be opposite a circumferentially neighbouring ring sector when the ring sector is mounted on the ring support structure, each inter-sector connecting edge having one or more grooves intended to receive a sealing tab.

According to another particular feature of the turbomachine part of the invention, the part is a nozzle sector extending in an annual manner around an axis, the sector comprising a sector structural body having an aerodynamic profile extending in a radial direction between an inner platform and an outer platform and, in an axial direction, between a leading edge and a trailing edge, said sector further comprising two inter-platform connecting edges present at the circumferential ends of each platform, each inter-platform connecting edge being intended to be opposite a platform of a neighbouring sector, each inter-platform connecting edge having one or more grooves intended to receive a sealing tab.

According to another particular feature of the turbomachine part of the invention, the part is a turbine blade extending in annual manner around an axis, the blade comprising a blade structural body extending in a radial direction between a root portion or inner portion and a blade tip or outer portion and, in an axial direction, between a leading-edge and a trailing edge, said body further comprising at least one platform, the turbine blade further comprising two inter-platform connecting edges at the circumferential ends of each platform, each inter-platform connecting edge being intended to be opposite a platform of a neighbouring blade, each inter-platform connecting edge having one or more grooves intended to receive a sealing tab.

The invention also relates to a method for manufacturing a turbomachine part of an annular assembly extending around an axis, the method comprising:
    producing a structural body,
    producing at least one connecting edge integral with the structural body made of composite material comprising a fibrous reinforcement consisting of randomly oriented short fibres, said reinforcement being densified by a ceramic matrix, each connecting edge having at least one groove intended to receive a sealing tab,
    fixing each connecting edge to the structural body.

The connecting edge or edges being made of ceramic matrix composite material and with short fibre reinforcement, fine and deep grooves can be easily obtained without machining difficulty and with a greater dimensional control. By providing the turbomachine part with one or more connecting edges made of ceramic matrix composite material, material that is able to withstand high temperatures, the need for cooling ventilation of the sealing zone or zones between the parts is considerably reduced or even removed.

According to a particular aspect of the method of the invention, the producing of the structural body comprises three-dimensional or multilayer weaving of a fibrous reinforcement and densifying of the fibrous reinforcement by a ceramic matrix. In this case, the part benefits from the advantages of the CMC material (good temperature resistance for a reduced overall mass) in its entirety, while facilitating the production of grooves for the sealing tabs and the control of the dimensions of said grooves. In this case the fixing of each connecting edge to the structural body is carried out by brazing, by mechanical connection or by co-silicidation.

According to a particular aspect of the method of the invention, the structural body is made of metal material. Thus a part is obtained having a good mechanical strength due to the metal structural body while eliminating the need for cooling in its sealing zones due to the production of connecting edges made of ceramic matrix composite material and short fibres. In this case, the fixing of each connecting edge to the structural body is carried out by brazing or by mechanical connection.

BRIEF DESCRIPTION OF THE FIGURES

FIG. 1A is a schematic exploded perspective view of two turbomachine parts corresponding to parts of a sectorised flow path in accordance with an embodiment of the invention;

FIG. 1B is a schematic perspective view of the two parts of FIG. 1A, once assembled;

FIG. 2A is a schematic exploded perspective view of a turbine ring sector according to an embodiment of the invention;

FIG. 2B is a schematic perspective view of the ring sector of FIG. 2A, once assembled;

FIG. 3A is a schematic exploded perspective view of a turbine ring sector according to an embodiment of the invention;

FIG. 3B is a schematic perspective view of the ring sector of FIG. 3A, once assembled;

FIG. 4 is a schematic perspective view of a stator sector according to an embodiment of the invention; and FIG. 5 is a schematic perspective view of a runner blade according to an embodiment of the invention.

DESCRIPTION OF THE EMBODIMENTS

The invention relates, in a general manner, to any turbomachine or gas turbine part intended to produce a seal with an adjacent part by means of at least one sealing tab housed in grooves present on the connecting edge or edges of adjacent parts. The part of the invention corresponds to a part used to form turbomachine annular assemblies such as turbine rings, nozzles, turbine runners, etc.

FIGS. 1A and 1B illustrate two turbomachine parts 10 and 20 corresponding to parts of a sectorised flow path extending in annual manner around an axis X. In FIGS. 1A and 1B, the parts 10 and 20 each comprise a structural body 11, 21 made of metal material or ceramic matrix composite material (CMC) and a connecting edge 12, 22. In FIGS. 1A and 1B, for the sake of simplification, only the connecting edges 12 and 22 of parts 10 and 20 are shown. The parts 10 and 20 each comprise another connecting edge at their axially opposite ends in order to produce a seal with the axially adjacent turbomachine parts (not shown in FIGS. 1A and 1B).

According to the invention, the connecting edges 12 and 22 are made of composite material comprising a fibrous reinforcement consisting of randomly-oriented short fibres, the reinforcement being densified by a ceramic matrix. The connecting edge 12 has a first groove 120 receiving a part of a first sealing tab 30 and a second groove 121 receiving a part of a second sealing tab 31. The connecting edge 22 has a first groove 220 receiving the other part of the first sealing tab 30 and a second groove 221 receiving the other part of the second sealing tab 31.

FIGS. 2A and 2B illustrate a turbomachine part corresponding to a turbine ring sector 40 extending in annular manner around an axis X. The ring sector 40 has a substantially inverted 7c-shaped section with an annular base 44, the inner face of which defines the gas stream flow path in a turbine (FIG. 2B). Upstream and downstream legs 45, 46 extend from the outer face of the annular base 12 and are intended to be fixed to annular flanges of a ring support structure that is not shown in FIGS. 2A and 2B. The ring sector 40 is one sector from a plurality of ring sectors together constituting a turbine ring, a seal being produced between all the circumferential adjacent ring sectors of the ring.

The turbine ring sector 40 comprises a structural body 41 made of ceramic matrix composite material (CMC) and two inter-sector connecting edges 42 and 43 respectively present at the circumferential ends 41a and 41b of the structural body 41.

According to the invention, the inter-sector connecting edges 42 and 43 are made of composite material comprising a fibrous reinforcement consisting of randomly-oriented short fibres, the reinforcement being densified by a ceramic matrix. The connecting edge 42 has a first groove 420 receiving a part of a first sealing tab 50, a second groove 421 receiving a part of a second sealing tab 51 and a third groove 422 receiving a part of a third sealing tab 52. The connecting edge 43 also has three grooves, not shown in FIGS. 2A and 2B, similar to the grooves 420, 421 and 422 of the inter-sector connecting edge 42 receiving respectively a part of a fourth sealing tab 53, a part of a fifth sealing tab 54 and a part of a sixth sealing tab 55.

FIGS. 3A and 3B illustrate a turbomachine part corresponding to a turbine ring sector 60 extending in annular manner around an axis X. The ring sector 60 has an annular base 64, the inner face of which defines the gas stream flow path in a turbine (FIG. 3B). The ring sector 60 is one sector from a plurality of ring sectors together constituting a turbine ring, a seal being produced between all the circumferential adjacent ring sectors of the ring.

The turbine ring sector 60 comprises a sector structural body 61 made of metal material and two inter-sectors connecting edges 62 and 63 respectively present at the circumferential ends 61a and 61b of the structural body 61.

According to the invention, the inter-sector connecting edges 62 and 63 are made of composite material comprising a fibrous reinforcement consisting of randomly-oriented short fibres, the reinforcement being densified by a ceramic matrix. The connecting edge 62 has a first groove 620 receiving a part of a first sealing tab 70, a second groove 621 receiving a part of a second sealing tab 71 and a third groove 622 receiving a part of a third sealing tab 72. The connecting edge 63 also has three grooves, not shown in FIGS. 3A and 3B, similar to the grooves 620, 621 and 622 of the inter-sector connecting edge 62 receiving respectively a part of a fourth sealing tab 73, a part of a fifth sealing tab 74 and a part of a sixth sealing tab 75.

FIG. 4 illustrates a turbomachine part corresponding to a turbine nozzle sector 80 extending in an annular manner around an axis X. The nozzle sector 80 has a sector structural body 81 made of CMC material comprising an aerodynamic profile 82 extending in a radial direction DR between an inner platform 83 and an outer platform 84 and, in an axial direction DA, between a leading-edge 82a and a trailing edge 82b. The nozzle sector 80 is one sector from a plurality of nozzle sectors together constituting a turbine nozzle, a seal being produced between all the circumferentially adjacent nozzle sectors of the nozzle.

The turbine ring sector 80 further comprises, at the inner platform 83, two inter-platform connecting edges 830 and 831, respectively present at the circumferential ends 83a and 83b of the inner platform 83. Similarly, the turbine ring sector 80 comprises, at the outer platform 84, two inter-platform connecting edges 840 and 841, respectively present at the circumferential ends 84a and 84b of the outer platform 84.

According to the invention, the inter-platform connecting edges 830, 831, 840 and 841 are made of composite material comprising a fibrous reinforcement consisting of randomly-oriented short fibres, the reinforcement being densified by a ceramic matrix. The connecting edges 830 and 831 respectively have a groove 8300 and a groove 8310, the groove 8300 receiving a part of a first sealing tab 90 while the groove 8310 receives a part of a second sealing tab 91. The connecting edge 840 has two grooves 8400 and 8401, respectively receiving a part of third and fourth sealing tabs 92 and 93. The connecting edge 841 also has two grooves 8410 and 8411, respectively receiving a part of a fourth sealing tab 94 and a part of a fifth sealing tab 95.

FIG. 5 illustrates a turbomachine part corresponding to a turbine blade 100 extending in an annular manner around an axis X. The blade 100 has a blade structural body 110 made of CMC material extending in a radial direction DR between a root portion or inner portion 111 and a blade tip or outer portion 112 and, in an axial direction DA, between a leading-edge 110a and a trailing edge 110b. In the example described here, the blade 100 further comprises an inner platform 130. The blade 100 is intended to be fixed on a hub (not shown in FIG. 5) by its root portion 111. The blade 100 is one blade of a plurality of blades fixed on a hub and together constituting a turbine runner or rotor, a seal being produced between all the circumferentially adjacent blades of the runner.

The blade 100 further comprises, at the inner platform 130, two inter-platform connecting edges 131 and 132 respectively present at the circumferential ends 130a and 130b of the inner platform 130.

According to the invention, the inter-platform connecting edges 131 and 132 are made of composite material comprising a fibrous reinforcement consisting of randomly-oriented short fibres, the reinforcement being densified by a ceramic matrix. The connecting edges 131 and 132 respectively have a groove 1310 and a groove 1320, the groove 1310 receiving a part of a first sealing tab 140 while the groove 1320 receives a part of a second sealing tab 141, which makes it possible to produce a seal in a turbomachine gas circulation flow path delimited by the meeting of the inner platforms of the blades.

As previously described, the turbomachine part according to the invention comprises a structural body which can be made of metal material or of ceramic matrix composite material.

When the structural body is made of ceramic matrix composite material, the parts made of CMC material are formed by a fibrous reinforcement made of refractory fibres (carbon or ceramic) which is densified by a ceramic matrix, in particular carbide, nitride, refractive oxide, etc. Typical examples of CMC materials are C—SiC (reinforcement made of carbon fibres and silicon carbide matrix), SiC—SiC materials and C—C/SiC materials (mixed carbon/silicon carbide matrix). The manufacture of parts made of CMC composite is well known. The fibrous reinforcement is preferably produced directly in one piece by three-dimensional weaving (3D). Here, "three-dimensional weaving" or "3D weaving" or "multilayer weaving" shall mean a weaving method by which at least some of the weft yarns link warp yarns over several layers of warp yarns or vice versa, by means of weaving corresponding to a weave type which can be chosen, in particular, from the following weaves: interlock, multi-canvas, multi-satin and multi-twill. The 3D reinforcements make it possible to obtain complex geometries with very high delamination resistance capacities.

The sealing tabs can be produced from nickel-based and/or cobalt-based alloy.

An example of manufacturing of connecting edges made of ceramic matrix composite material and with short fibre reinforcement begins with the supply of short fibres which can be obtained by mechanical grinding, by energy grinding, or by cutting long fibres, then sieving for the fibres meeting the length specification which is between 10 μm and 1000 μm. This is followed by depositing an interphase corresponding to the formation of an interphase layer around the short fibres, in order to un-weaken the final material. The interphase deposit can be produced by chemical vapour deposition (CVD) in a fluidised bed. The short fibres coated with the interphase are then mixed with a powder of ceramic particles, for example silicon carbide particles, and an organic binder comprising at least one polymer, for example a thermoplastic polymer chosen, for example, from: polyvinyl alcohol (PVA), polyethylene glycol (PEG), polypropylene (PP), polyoxymethylene (POM), polyethylene terephthalate (PET) or a thermosetting polymer chosen, for example, from the following: epoxy resins, phenolic resins, pre-ceramic resins.

The mixture is injected into a mould having the shape of the end part or a shape intermediate to the end shape of the end part. The organic binder is then polymerised. The solidified assembly, which corresponds to a green body, is then de-moulded. The following step consists of infiltrating the green body with a molten silicon-based composition (silicidation) so as to form a ceramic matrix, a densification process known by the process name MI ("Melt Infiltration") corresponding to the colonisation of the residual ports of the debindered material by capillary rise of a molten metal, for example silicon.

Examples of manufacture of a part made of ceramic matrix composite material with short fibres are disclosed, in particular, in documents WO 2019/122760 and WO 2019/122758.

If necessary, a machining can be performed by machining the densified part in order to arrive at the final geometry.

In this way, a connecting edge is obtained comprising short fibres having a length between 10 μm and 1000 μm and covered with an interphase, the fibres being oriented and distributed in a random manner within a silicon and silicon carbide matrix. The manufacture of the connecting edges does not comprise a weaving operation.

When the structural body is made of composite material comprising a 3D-woven or multilayer-woven fibre reinforcement densified by a ceramic matrix, the connecting edge or edges can be produced in one piece with the structural body or manufactured separately then attached to the structural body.

In the first case, a preform of the structural body in the consolidated state, namely the 3D-woven or multilayer-woven fibre reinforcement shaped and consolidated by depositing of an interphase as already described above, is placed in a mould or holding tool with one or more connecting edge green bodies in contact with the circumferential end or ends of the preform of the structural body. The assembly is then subject to a co-silicidation enabling the connecting edge or edges to be fixed on the structural body and the final turbine part to be obtained.

In the case where the structural body and the connecting edge or edges are manufactured separately, the connecting edge or edges can be fixed to the structural body by brazing or mechanical connection (bolting, clamping, interlocking, etc.).

When the structural body is made of metal material, the connecting edge or edges can be produced separately then fixed to the structural body by brazing or mechanical connection (bolting, clamping, interlocking, etc.).

The invention claimed is:

1. A turbomachine part of an annular assembly extending around an axis, the part comprising a structural body and at least one connecting edge, each connecting edge having at least one groove receiving a sealing tab, wherein each connecting edge is made of composite material comprising a fibrous reinforcement consisting of randomly-oriented short fibres, said reinforcement being densified by a ceramic matrix, wherein the structural body is made of a material different from the composite material comprising a fibrous reinforcement consisting of randomly-oriented short fibres of said at least one connecting edge and wherein said at least one connecting edge is fixed on the structural body, wherein the part is a turbine ring sector extending in an annual manner around an axis, the sector comprising a sector structural body having an annular base having an inner face adapted to define the inner face of a turbine ring when the ring sector is mounted on a ring support structure, and an outer face from which one or more attachment portions of the ring sector extend to the ring support structure, the ring sector further comprising two inter-sector connecting edges at the circumferential ends of the sector structural body, each inter-sector connecting edge being adapted to be opposite a circumferentially neighbouring ring sector when the ring sector is mounted on the ring support structure, each inter-sector connecting edge having one or more grooves each adapted to receive the sealing tab.

2. The part according to claim 1, wherein the structural body is made of composite material comprising a fibrous reinforcement consisting of a plurality of layers of yarns linked together by three-dimensional or multilayer weaving, said reinforcement being densified by a ceramic matrix.

3. The part according to claim 1, wherein the structural body is made of metal material.

4. The part according to claim 1, wherein the at least one connecting edge is fixed on the structural body by co-silicidation.

5. The part according to claim 1, wherein the at least one connecting edge is fixed on the structural body by brazing.

6. The part according to claim 1, wherein the at least one connecting edge is fixed on the structural body by a mechanical connection.

7. The part according to claim 6, wherein the mechanical connection is bolting, clamping or interlocking.

8. A turbomachine part of an annular assembly extending around an axis, the part comprising a structural body and at least one connecting edge, each connecting edge having at least one groove receiving a sealing tab, wherein each connecting edge is made of composite material comprising a fibrous reinforcement consisting of randomly-oriented short fibres, said reinforcement being densified by a ceramic matrix, wherein the structural body is made of a material different from the composite material comprising a fibrous reinforcement consisting of randomly-oriented short fibres of said at least one connecting edge and wherein said at least one connecting edge is fixed on the structural body, wherein the part is a nozzle sector extending in an annual manner around an axis, the sector comprising a sector structural body having an aerodynamic profile extending in a radial direction between an inner platform and an outer platform and, in an axial direction, between a leading edge and a trailing edge, said sector further comprising two inter-platform connecting edges present at the circumferential ends of each platform, each inter-platform connecting edge being adapted to be opposite a platform of a circumferentially neighbouring sector, each inter-platform connecting edge having one or more grooves each adapted to receive the sealing tab.

9. A turbomachine part of an annular assembly extending around an axis, the part comprising a structural body and at least one connecting edge, each connecting edge having at least one groove receiving a sealing tab, wherein each connecting edge is made of composite material comprising a fibrous reinforcement consisting of randomly-oriented short fibres, said reinforcement being densified by a ceramic matrix, wherein the structural body is made of a material different from the composite material comprising a fibrous reinforcement consisting of randomly-oriented short fibres of said at least one connecting edge and wherein said at least one connecting edge is fixed on the structural body, wherein the part is a turbine blade extending in an annual manner around an axis, the blade comprising a blade structural body extending in a radial direction between a root portion or inner portion and a blade tip or outer portion and, in an axial direction, between a leading-edge and a trailing edge, said body further comprising at least one platform, the turbine blade further comprising two inter-platform connecting edges at the circumferential ends of each platform, each inter-platform connecting edge being adapted to be opposite a platform of a circumferentially neighbouring blade, each inter-platform connecting edge each having one or more grooves adapted to receive the sealing tab.

10. A method for manufacturing a turbomachine part of an annular assembly extending around an axis, the part comprising a structural body and at least one connecting edge, each connecting edge having at least one groove receiving a sealing tab, wherein each connecting edge is made of composite material comprising a fibrous reinforcement consisting of randomly-oriented short fibres, said reinforcement being densified by a ceramic matrix, wherein the structural body is made of a material different from the composite material comprising a fibrous reinforcement consisting of randomly-oriented short fibres of said at least one connecting edge and wherein said at least one connecting edge is fixed on the structural body, wherein the part is a turbine ring sector extending in an annual manner around an axis, the sector comprising a sector structural body having an annular base having an inner face adapted to define the inner face of a turbine ring when the ring sector is mounted on a ring support structure, and an outer face from which one or more attachment portions of the ring sector extend to the ring support structure, the ring sector further comprising two inter-sector connecting edges at the circumferential ends of the sector structural body, each inter-sector connecting edge being adapted to be opposite a circumferentially neighbouring ring sector when the ring sector is mounted on the ring support structure, each inter-sector connecting edge having one or more grooves each adapted to receive the sealing tab, the method comprising:

producing the structural body, producing the at least one connecting edge made of composite material comprising the fibrous reinforcement consisting of randomly oriented short fibres, said reinforcement being densified by the ceramic matrix, each connecting edge having the at least one groove receiving the sealing tab, and fixing each connecting edge to the structural body, the structural body being made of a material different from the composite material comprising a fibrous reinforcement consisting of randomly-oriented short fibres of said at least one connecting edge.

11. The method according to claim 10, wherein producing the structural body comprises three-dimensional or multi-layer weaving of a fibrous reinforcement and densifying of the fibrous reinforcement by a ceramic matrix.

12. The method according to claim 11, wherein the fixing of each connecting edge to the structural body is carried out by brazing, by mechanical connection or by co-silicidation.

13. The method according to claim 10, wherein the structural body is produced from metal material.

14. The method according to claim 10, wherein the fixing of each connecting edge to the structural body is carried out by brazing or by mechanical connection.

* * * * *